Oct. 27, 1970  H. A. CAUGHLIN  3,535,863
SWATH SEPARATOR
Filed Jan. 15, 1968
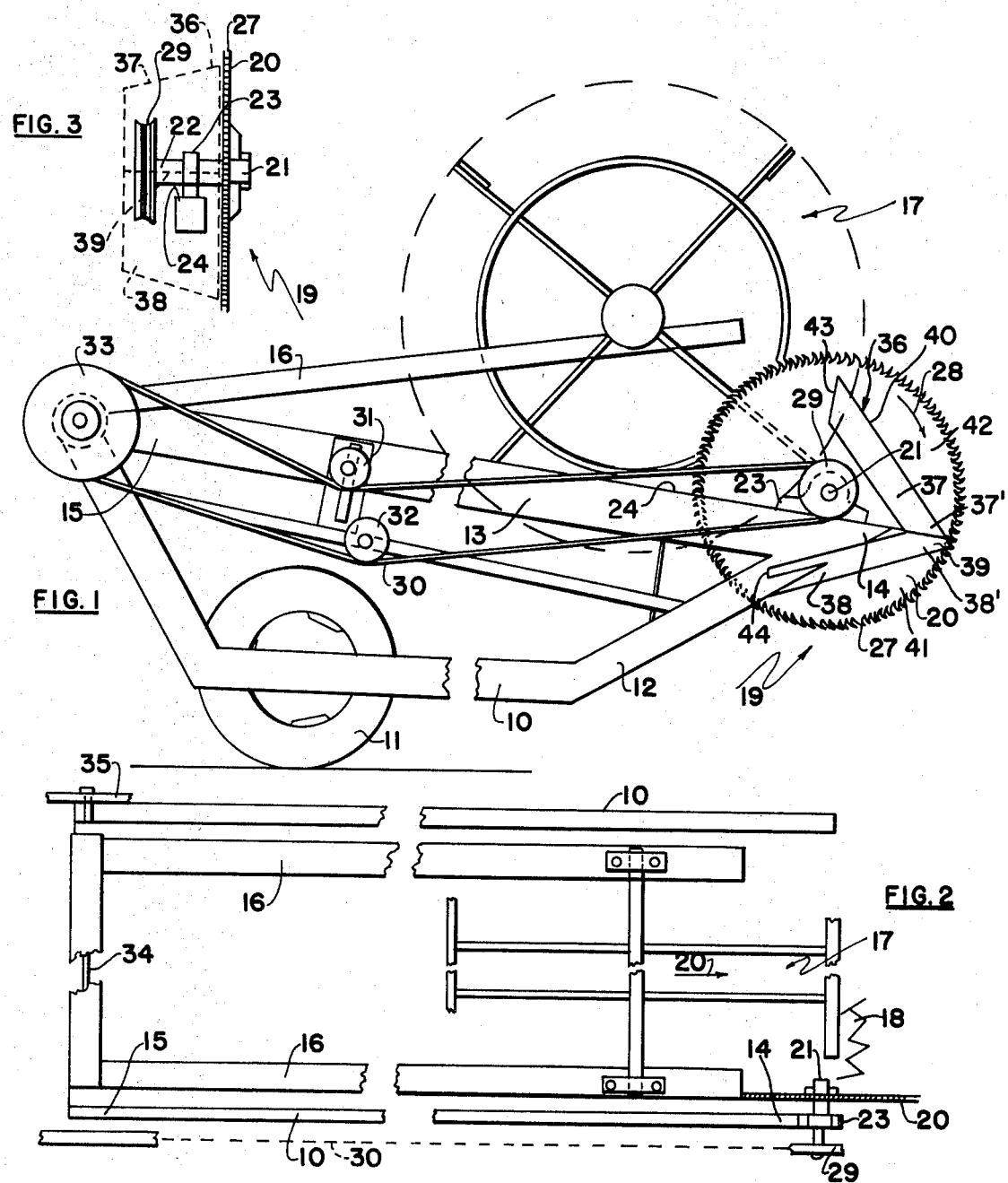
INVENTOR
HUGH ALBERT CAUGHLIN
By
ATTORNEY United States Patent Office 3,535,863
Patented Oct. 27, 1970

3,535,863
SWATH SEPARATOR
Hugh Albert Caughlin, Box 203, Bowsman,
Manitoba, Canada
Filed Jan. 15, 1968, Ser. No. 697,782
Int. Cl. A01d 63/02
U.S. Cl. 56—315        1 Claim

ABSTRACT OF THE DISCLOSURE

This invention consists of a serrated saw type blade journalled for rotation adjacent one end of the cutting bar of a swather or combine and rotated from the source of power. This cuts and severs any straw or stalks between the area being swathed and the unswathed area thus reducing considerably the tendency of many crops to shatter at this point due to dragging. A straw deflecting guard at one side of the saw blade prevents entanglement of straw with the drive of the blade.

---

This invention relates to new and useful improvements in swath separators adapted to be secured to harvesting machines such as swathers, combines or the like which include transverse cutter bar assemblies and reels.

The object of the device is to separate the swath from the unswath area. There is usually a parting board or separator situated at one side of the machine just in advance of the cutter bar assembly and this is meant to part the standing grain or crop prior to cutting. However, there is always some dragging at this point and with many crops this causes shattering or tearing of the crop at the dividing line. This is particularly noticeable with crops such as rapeseed or mustard seed or any vine crop such as field peas or beans. All of these crops shatter easily particularly if there is the slightest hanging up on the divider or separator normally used.

This causes considerable wastage when harvesting a relatively large field and the object of the present invention is to reduce if not eliminate the majority of wastage.

I accomplish this by providing a serrated cutter blade journalled for rotation in a vertical plane and travelling parallel to the direction of motion of the machine. This cutter blade is situated on one side of the machine just in advance of the cutter bar assembly and is of course, secured to the source of power. Rotation of this serrated cutter blade severs the crop cleanly and without dragging or hanging up occurring.

The device is easily attached to all types of combines or swathers and is also easily connectable to the source of power driving said combine or swather.

The device is simple in construction, economical in manufacture, and otherwise well suited to the purpose for which it is designed.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein with due regard in this connection being had to the accompanying figures in which:

FIG. 1 is a partial side view of a swather showing my device in situ.

FIG. 2 is a partial top plan view of FIG. 1.

FIG. 3 is a fragmentary front elevation of the device per se.

In the drawings like characters of reference indicate corresponding parts in the different figures.

Proceeding therefore to describe the invention in detail, it will of course be appreciated that the device can be utilized on swathers or combines. Reference character 10 illustrates longitudinal chassis components of a swather which is usually wheel mounted as shown schematically at 11.

The chassis includes a lower member 12 and an upper member 13 which converge together to a front end portion 14 and a rear end portion 15. Reel arms 16 are usually pivoted around the portion 15 and these reel arms carry a conventional reel assembly collectively designated 17.

A transverse cutter knife assembly 18 is situated between the longitudinal chassis members 10 and is driven in the conventional manner from the source of power (not illustrated) which rotates the reel.

My device collectively designated 19 is situated on one side of the swather or harvester and slightly in advance of the cutter bar assembly 18. The side upon which the device is mounted depends, of course, on the direction of travel of the harvester. It is, of course, necessary that the device 19 be mounted so that it is always acting upon the line of separation between the strip of grain or crop being harvested and the remainder of the unharvested crop.

The device consists of a serrated blade 20 secured to one end 21 of the shaft or spindle 22 which is journalled for rotation within a pillow block bearing 23 or the like secured upon the upper side 24 of one longitudinal chassis side.

The device is mounted so that the serrated disc or blade 20 rotates in a vertical plane parallel to the direction of travel of the machine indicated by arrow 26.

The teeth 27 of the serrated blade or disc 20 are preferably shaped as shown in FIG. 1 and the disc or blade is preferably rotated in the direction of arrow 28 so that the teeth are always in trailing relationship with the direction of travel. This prevents hanging up or jerking of the crop being severed, particularly when such crop is a vine crop.

Means operatively connecting the blade to the source of power consist of a pulley 29 secured to the other end of shaft or spindle 22 and a V-belt 30 extending around this pulley, around upper and lower idlers 31 and 32 respectively and around a drive pulley 33 secured to a shaft 34 preferably co-axial with the pivotal connection of the reel arms 16. This shaft is connected directly to the source of power either by chain, gear or pulley such as shown in FIG. 2 by reference character 35.

It is necessary to protect the spindle or shaft 22 and the pulley 29 from straw or vines and the like otherwise these may twist around the shaft and jam same.

I have provided a shroud assembly collectively designated 36. This shroud is suitably secured to the machine frame and consists of a pair of plates 37 and 38, the ends 37' and 38' of which are secured together to form an apex 39. The ends are shaped so that the plates 37 and 38 diverge from the apex as clearly seen and furthermore these plates are tilted around the longitudinal axis thereof inwardly towards the pulley 29 so that the shroud presents a profile in the form of an arrow head with the edges 40 and 41 of the plates being almost in interfacial contact with the side 42 of the blade and the other ends 43 and 44 of the plates being situated adjacent the periphery and rearwardly of the pulley 29.

This novel shroud parts any straw or vine upwardly, downwardly and outwardly from the pulley 29 and shaft 22 therefore virtually eliminating any tendency of the vines from being caught up by the pulley and shaft.

What I claim as my invention is:

1. In a harvesting machine including a frame having a pair of side members and a transverse cutter bar assembly supported by said frame between said side members, the combination of a circular saw type cutter blade disposed in a vertical plane adjacent one end of said transverse cutter bar assembly in parallel to the direction in which the machine travels so as to separate crop being cut by said cutter bar assembly from uncut crop, a bearing block provided on one of said frame side members adjacent said cutter blade, a shaft rotatably journalled in said bearing block and having said cutter blade mounted thereon, an endless belt type drive operatively connecting said shaft to a source of power for rotating the shaft and the associated cutter blade, and a crop deflecting guard mounted on said one of said frame members at one side of said cutter blade and at least partially enclosing said bearing block and said shaft and said belt type drive to prevent entanglement of the crop therewith, said guard being substantially V-shaped in side elevation and comprising a pair of rearwardly divergent plates having their forward ends secured together at a point spaced forwardly from said bearing block, said plates extending rearwardly above the bearing block and drive and below the bearing block and drive so as to at least partially enclose the same as aforesaid, said plates also being slanted toward each other in the transverse direction away from said cutter blade, whereby to coact with the rearward divergence thereof in providing the guard with an arrow-shaped profile to assist in the performance of its crop separating function.

References Cited

UNITED STATES PATENTS

| | | | |
|---|---|---|---|
| 651,626 | 6/1900 | Hord | 56—315 |
| 652,274 | 6/1900 | Klitzke | 56—315 |
| 877,652 | 1/1908 | Laflin | 56—315 |
| 1,971,866 | 8/1934 | McClure et al. | 56—315 |
| 2,562,387 | 7/1951 | Perry | 56—317 XR |

FOREIGN PATENTS

| | | |
|---|---|---|
| 364,344 | 1/1932 | Great Britain. |
| 76,580 | 10/1953 | Denmark. |
| 616,159 | 1/1961 | Italy. |

RUSSELL R. KINSEY, Primary Examiner